United States Patent Office 3,467,721
Patented Sept. 16, 1969

3,467,721
EXTRACTION OF PHENOL
Thomas Bewley, Epsom, Surrey, England, assignor to The Distillers Company Limited, Edinburgh, Scotland, a British company
No Drawing. Filed Sept. 26, 1966, Ser. No. 581,678
Claims priority, application Great Britain, Oct. 16, 1965, 43,945/65
Int. Cl. C07c 37/24, 39/12
U.S. Cl. 260—621                          15 Claims

ABSTRACT OF THE DISCLOSURE

A method of separating phenol produced from acid cleavage of cumene hydroperoxide from aqueous mixtures containing same by extracting said phenol with mesityl oxide.

---

The present invention relates to the separation of phenols from aqueous mixtures containing them and in particular to such separation by means of solvent extraction.

In operation of any of the known processes for the production of phenols on a commercial scale it is necessary to recover phenol product from solution in aqueous effluents to ensure that the aqueous effluent is suitable for discharge to normal effluent disposal channels. Thus it is known to treat aqueous mixtures containing dissolved phenols with extraction solvents for the phenols, e.g., benzene, acetophenone, petroleum or tar fractions, isopropyl ether, butyl acetate, tricresyl phosphate, and to recover the extracted phenol from the solvent phase for example by distillation or treatment with aqueous alkali.

It has now been found that mesityl oxide may advantageously be employed as an extraction solvent for phenols.

Accordingly the present invention is a process for the separation of phenols from aqueous mixtures containing them which comprises extracting the phenols with a phenol-dissolving extraction solvent comprising mesityl oxide.

The extraction solvent may contain in addition to mesityl oxide aryl hydrocarbons such as benzene, toluene, xylene or cumene. In the application of the process of the present invention to the separation of phenol produced by acid cleavage of cumene hydroperoxide from aqueous mixtures, it is preferred to employ mixtures of mesityl oxide and cumene as the extraction solvent since such mixtures are readily available as by-products from the purification stages of the phenol-producing process. It will be appreciated, however, that the process of the invention is applicable to the treatment of any aqueous phenolic mixtures regardless of origin. The amount of mesityl oxide present in admixtures with the aryl hydrocarbon may be between 1 and 5% by volume but preferably greater than 5% by volume based on the total mixtures of mesityl oxide and hydrocarbon.

The extraction of the phenols from aqueous admixtures may be carried out in any convenient manner such as a countercurrent system in a column, or multistage mix and settle systems. In the extraction of phenols from such mixtures it is preferred, if necessary to adjust the pH of these solutions before carrying out the extraction to be neutral or slightly acid. In addition it is preferred to reduce the solubility of the mesityl oxide in the aqueous solution by the addition to the latter of metallic salts such as sodium chloride, sodium sulphate or sodium carbonate. Certain of these salts may already be present in the aqueous solutions to be treated as residues produced during the phenol forming process.

Isolation of phenol from the phenol-rich solvent may be carried out in any convenient manner, e.g., distillation or treatment with aqueous alkali to produce aqueous phenolate solutions from which phenol may be recovered by acidification or recycled to the process.

The use of phenol dissolving extraction solvents comprising mesityl oxide in accordance with the present invention has the advantage over solvents employed hitherto that the partition coefficient for phenols between the solvent and water is greater under comparable conditions in the case of mesityl oxide solvents and thus a more efficient and economic extraction of phenols is possible. Moreover the use of solvents in accordance with the invention allows for a greater throughput of solution through the extraction apparatus. These advantages are more clearly illustrated with reference to the following examples.

EXAMPLE 1

Portions of an aqueous mixture containing 1% w./v. of phenol were shaken with different solvents for five minutes at ambient temperature. The volume ratio of solvent to aqueous mixture was 2:1. After shaking, the mixture of solvent and aqueous phase was allowed to settle and the phenol content remaining in the aqueous phase was determined. The extraction was then repeated. The results are shown in the following table, those obtained with solvents of the invention being compared with the result obtained using an acetophenone/cumene solvent, thereby demonstrating the advantage of the solvent of the invention.

TABLE I

| Mixture | Phenol in aqueous phase, p.p.m. w./v. | | | Partition coefficient on 1st extraction |
|---|---|---|---|---|
| | 1st extraction | 2d extraction | 3d extraction | |
| Mesityl Oxide: Cumene: | | | | |
| 20:80 | 300 | 16 | 5 | 16 |
|  | 320 | 19 | 5 | 15 |
|  | 290 | 13 | 5 | 17 |
| 10:90 | 570 | 39 | 5 } | 9 |
|  | 540 | 50 | 5 } | |
| 5:95 | 1,140 | 125 | 14 | 4 |
| Mesityl oxide: cumene mixture from cumene-phenol process* | 520 | 30 | 5 } | 9 |
|  | 540 | 27 | 5 } | |
| Acetophenone: cumene, 10:90 | 830 | 82.5 | 16 | 5 |

*Composition=M.O. 10%; Cumene 82.7%; Ethyl benzene 7.0% and Methyl Styrene 0.3%.

EXAMPLE 2

Example 1 was repeated using a different aqueous phenolic effluent and a comparison test carried out using a solvent not in accordance with the invention. The results are shown in the following table.

TABLE II

| Mixture | Initial | Phenol in aqueous phase, p.p.m. w./v. | | | Partition coefficient on 1st extraction |
|---|---|---|---|---|---|
| | | 1st extraction | 2d extraction | 3d extraction | |
| Mesityl oxide* | 9,700 | 65 | | | 148 |
| Acetophenone* | 9,700 | 194 | | | 49 |
| Mesityl Oxide: Cumene 50:50 | 8,200 | 58 | 13 | 5 | 70 |
| Acetophenone: Cumene, 50:50 | 8,200 | 140 | 50 | 5 | 29 |
|  | 10,000 | 144 | 25 | 8 | 34 |
| Mesityl Oxide: Cumene, 30:70 | 10,000 | 144 | 30 | 5 | 34 |

* Extraction carred out with a volume ratio solvent to aqueous mixture of 1:1.

The above results clearly demonstrate the advantages to be gained by operating in accordance with the invention.

A further comparison test was carried out using cumene alone as solvent in a 1:1 volume ratio with aqueous mixtures containing different concentrations of phenol. The results are shown in the table below.

TABLE III

| Phenol in aqueous mixture, percent w./v. | Phenol in solvent phase, p.p.m. w./v. | Phenol in aqueous phase, p.p.m. w./v. | Partition coefficient |
|---|---|---|---|
| 0.3 | 18,000 | 12,000 | 1.5 |
| 0.5 | 32,000 | 19,000 | 1.68 |
| 1.2 | 76,000 | 43,000 | 1.77 |
| 2.0 | 123,000 | 79,000 | 1.56 |
| 5.3 | 341,000 | 191,000 | 1.79 |

Comparison of the above results in Table III with those in Table 1 show for example that the presence of only 5-10 parts of mesityl oxide in an admixture with cumene greatly increases the partition in favour of the solvent phase.

EXAMPLE 3

An aqueous effluent containing 1% w./w. of phenol was extracted with (a) 60/40 v./v. mesityl oxide/cumene mixture (b) 60/40 v./v. acetophenone/cumene mixture in a 2 ft. high rotating disc column at room temperature (19-21° C.). The following results were obtained.

TABLE IV

| Exp. No. | Phenol, percent w./w. | | | Solvent/Aqueous feed ratio by volume | Overall flow, cm./sec. | Overall flooding rate, cm./sec. | Mass transfer coefficient |
|---|---|---|---|---|---|---|---|
| | Aqueous feed | Solvent extract | Raffinate | | | | |
| 60/40 v./v. mesityl oxide/cumene | 0.97 | 0.54 | 0.0001 | 1.89 | 0.161 | 0.32 | 30.8 |
| 60/40 acetophenone/cumene | 1.00 | 0.31 | 0.0007 | 2.9 | 0.052 | 0.066 | 5.8 |

The above results clearly demonstrate the advantages of using solvents comprising mesityl oxide in accordance with the invention in that:

(1) Mesityl oxide/cumene in a volume ratio of (1.89) reduces the phenol in the raffinate to 1 p.p.m. whereas with acetophenone/cumene in a higher volume ratio (2.9) the phenol in the effluent is 7 p.p.m.

(2) With mesityl oxide/cumene mixtures the extraction system employed will handle more material before flooding, i.e., it has an increased capacity.

I claim:

1. A process for the separation of phenol from aqueous mixtures containing it which comprises extracting phenol with mesityl oxide.

2. A process as claimed in claim 1 wherein the phenol is extracted with an extraction solvent containing an aryl hydrocarbon in addition to said mesityl oxide.

3. A process as claimed in claim 2 wherein the aryl hydrocarbon is selected from the group consisting of benzene, toluene, xylene and cumene.

4. A process as claimed in claim 3 wherein the aryl hydrocarbon is cumene and the extraction solvent is obtained from the purification stages of a process for the production of phenol by the acid cleavage of cumene hydroperoxide.

5. A process as claimed in claim 2 wherein the amount of mesityl oxide present in the extraction solvent is between 1 and 5% by volume based on the total mixture of mesityl oxide and aryl hydrocarbon.

6. A process as claimed in claim 2 wherein the amount of mesityl oxide present in the extraction solvent is greater than 5% by volume based on the total mixture of mesityl oxide and aryl hydrocarbon.

7. A process as claimed in claim 1 wherein the aqueous mixture containing phenol is rendered neutral before extraction.

8. A process as claimed in claim 1 wherein the aqueous mixture containing phenol is rendered slightly acidic before extraction.

9. A process as claimed in claim 1 wherein metallic salts are added to the aqueous mixture before extraction.

10. A process as claimed in claim 9 wherein the metallic salts are selected from the group consisting of sodium chloride, sodium sulphate or sodium carbonate.

11. A process as claimed in claim 1 wherein the extraction of phenol from aqueous admixtures is carried out in a countercurrent system.

12. A process as claimed in claim 1 wherein the extraction of phenol from aqueous admixtures is carried out in a multistage mix system.

13. A process as claimed in claim 1 wherein the extraction of phenol from aqueous admixtures is carried out in a settle system.

14. A process as claimed in claim 1 wherein phenol is isolated from the phenol rich solvent by distillation.

15. A process as claimed in claim 1 wherein the phenol is isolated from the phenol rich solvent by treatment with aqueous alkali to produce aqueous phenolate solutions followed by recovery of the phenol by acidification of such solutions.

References Cited

UNITED STATES PATENTS 3,155,734   11/1964   Merkel _____ 260—621

FOREIGN PATENTS 760,862   5/1953   Germany.

LEON ZITVER, Primary Examiner

NORMAN P. MORGENSTERN, Assistant Examiner

U.S. Cl. X.R.

260—627